United States Patent
Shitagami et al.

(10) Patent No.: US 9,366,936 B2
(45) Date of Patent: Jun. 14, 2016

(54) ELECTROPHORESIS DISPLAY APPARATUS AND METHOD OF MANUFACTURING ELECTROPHORESIS DISPLAY APPARATUS

(71) Applicant: Seiko Epson Corporation, Tokyo (JP)

(72) Inventors: Kozo Shitagami, Chino (JP); Harunobu Komatsu, Masumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/499,676

(22) Filed: Sep. 29, 2014

(65) Prior Publication Data

US 2015/0098123 A1 Apr. 9, 2015

(30) Foreign Application Priority Data

Oct. 7, 2013 (JP) ................... 2013-209930

(51) Int. Cl.
*G02B 26/00* (2006.01)
*G02F 1/03* (2006.01)
*G09G 3/34* (2006.01)
*G02F 1/167* (2006.01)

(52) U.S. Cl.
CPC ........ *G02F 1/167* (2013.01); *G02F 2001/1672* (2013.01); *G02F 2001/1676* (2013.01); *G02F 2202/022* (2013.01); *G02F 2202/16* (2013.01)

(58) Field of Classification Search
USPC .................. 359/290–297, 259, 245; 345/107
See application file for complete search history.

(56) References Cited

U.S. PATENT DOCUMENTS

| | | | |
|---|---|---|---|
| 7,005,468 B2 * | 2/2006 | Zang | C09J 153/00 359/254 |
| 7,800,813 B2 | 9/2010 | Wu et al. | |
| 7,880,958 B2 | 2/2011 | Zang et al. | |
| 8,179,589 B2 | 5/2012 | Wu et al. | |
| 8,331,016 B2 | 12/2012 | Shitagami et al. | |
| 8,379,294 B2 | 2/2013 | Jun | |
| 8,441,432 B2 | 5/2013 | Zang et al. | |
| 8,503,066 B2 | 8/2013 | Shitagami et al. | |
| 8,547,628 B2 | 10/2013 | Wu et al. | |
| 8,611,000 B2 | 12/2013 | Komatsu et al. | |
| 2003/0035885 A1 * | 2/2003 | Zang | C09J 153/00 427/58 |
| 2004/0085619 A1 | 5/2004 | Wu et al. | |
| 2004/0112525 A1 * | 6/2004 | Pereira | G02F 1/167 156/292 |
| 2004/0216837 A1 * | 11/2004 | Pereira | C08G 18/3814 156/292 |
| 2006/0215253 A1 * | 9/2006 | Kanbe | G02F 1/167 359/296 |
| 2006/0255322 A1 | 11/2006 | Wu et al. | |
| 2011/0256306 A1 | 10/2011 | Shitagami et al. | |

FOREIGN PATENT DOCUMENTS

| | | |
|---|---|---|
| JP | 2005-533289 A | 11/2005 |
| JP | 2009-509206 A | 3/2009 |
| JP | 2011-180615 A | 9/2011 |

(Continued)

*Primary Examiner* — Mohammed Hasan
(74) *Attorney, Agent, or Firm* — ALG Intellectual Property, LLC

(57) ABSTRACT

An electrophoresis display apparatus of this disclosure is provided with a pair of substrates, an electrophoresis layer including electrophoresis particles and a dispersion medium in which the electrophoresis particles are dispersed, a barrier wall which is arranged between the pair of substrates and divides a cell in which the electrophoresis layer is arranged, and a sealing member which seals the electrophoresis layer arranged in the cell, in which the sealing member includes a first layer and a second layer laminated on the first layer, and in which the electric resistance of the second layer is lower than that of the first layer.

14 Claims, 6 Drawing Sheets

(56) References Cited

FOREIGN PATENT DOCUMENTS

| JP | 2011-221448 A | 11/2011 |
| JP | 2012-2876 A | 1/2012 |
| JP | 2012-2924 A | 1/2012 |
| JP | 2012-63419 A | 3/2012 |
| JP | 2012-88547 A | 5/2012 |
| JP | 2012-98640 A | 5/2012 |
| JP | 2013-7985 A | 1/2013 |

* cited by examiner

ELECTROPHORESIS DISPLAY APPARATUS AND METHOD OF MANUFACTURING ELECTROPHORESIS DISPLAY APPARATUS

BACKGROUND

1. Technical Field

The present invention relates to an electrophoresis display apparatus and a method of manufacturing an electrophoresis display apparatus.

2. Related Art

In the related art, as an electrophoresis display apparatus, one having a structure in which an electrophoresis element dispersing electrophoresis particles in a region divided by a barrier wall formed between a pair of substrates is arranged to seal with a sealing member is known (for example, JP-A-2013-7985). In this electrophoresis display apparatus, as a sealing member, a material including a water-soluble polymer is used.

However, there was a problem in that a driving voltage of a display apparatus becomes high since electric resistance of a sealing member formed by a material including a water-soluble polymer becomes high.

SUMMARY

An advantage of some aspects of the invention is to provide an electrophoresis display apparatus capable of realizing low power consumption by reducing a driving voltage and a method of manufacturing an electrophoresis display apparatus.

According to a first aspect of the invention, there is provided an electrophoresis display apparatus provided with a pair of substrates, an electrophoresis layer including electrophoresis particles and a dispersion medium in which the electrophoresis particles are dispersed, a barrier wall which is arranged between the pair of substrates and divides a cell in which the electrophoresis layer is arranged, and a sealing member which seals the electrophoresis layer arranged in the cell, in which the sealing member includes a first layer and a second layer laminated on the first layer, and in which the electric resistance of the second layer is lower than that of the first layer.

In the electrophoresis display apparatus according to the first aspect, it is possible to reduce the resistance of the surface of the sealing member by providing with the second layer. Thereby, for example, it is possible to reduce the contact resistance between an electrode layer which is arranged on the sealing member and the sealing member. Therefore, it is possible to realize low power consumption by reducing the driving voltage of the electrophoresis layer. In addition, in a case where the second layer is used as an electrode layer, since there is no need to be separately provided with the electrode layer, it is possible to achieve cost reduction.

In the first aspect, it is preferable that the first layer be compatibilized with the second layer at an interface.

According to this configuration, since the first layer is compatibilized with the second layer at the interface, the first layer and the second layer become in a state of being strongly adhered to each other, and thus an occurrence of exfoliation or the like is prevented. In addition, the electrophoresis layer is brought close to the second layer due to forming to a state in which the second layer enters inside the first layer. Thereby, it is possible to effectively reduce the driving voltage which is applied to the electrophoresis layer.

In the first aspect, as to the second layer, it is preferable that a material including a conductive polymer be applied onto the first layer.

According to this configuration, it is possible to simply and surely form the second layer by applying the material including the conductive polymer onto the first layer. Therefore, it is possible to suppress the manufacturing cost of the second layer.

In the first aspect, as to the first layer, it is preferable that a part corresponding to the cell be recessed.

According to this configuration, the second layer is arranged in accordance with recesses on the first layer. Therefore, it is possible to reduce the driving voltage in each cell.

In the first aspect, as to the second layer, it is preferable that the thickness of a part corresponding to the barrier wall be thinner than the thickness of a part corresponding to the cell.

According to this configuration, it is possible to effectively reduce the resistance inside the cell.

In the first aspect, it is preferable that the second layer be laminated in the form of an island on the first layer.

According to this configuration, it is possible to selectively reduce the resistance of the sealing member.

In the first aspect, it is preferable that the second layer be arranged at a position corresponding to the cell.

According to this configuration, it is possible to selectively reduce the resistance of the position corresponding to the cell. Thereby, it is possible to effectively reduce the driving voltage in each cell.

According to a second aspect of the invention, there is provided a method of manufacturing an electrophoresis display apparatus provided with arranging an electrophoresis layer including electrophoresis particles and a dispersion medium in which the electrophoresis particles are dispersed, in a cell divided by a barrier wall member on a substrate, and sealing the cell on which the electrophoresis layer is arranged by a sealing member, in which the sealing includes forming a first layer which seals the cell and laminating a second layer of which the electric resistance is lower than that of the first layer on the first layer.

In the method of manufacturing an electrophoresis display apparatus according to the second aspect, it is possible to manufacture the sealing member in which the resistance of the surface is reduced by forming the second layer. Thereby, for example, it is possible to reduce the contact resistance between the electrode layer arranged on the sealing member and the sealing member. Therefore, it is possible to provide the electrophoresis display apparatus in which the low power consumption is achieved by reducing the driving voltage. In addition, since the second layer can be used as an electrode layer, there is no need to be separately provided with the electrode layer, and since the manufacturing process is simplified, it is possible to achieve cost reduction.

In the second aspect, in the sealing, it is preferable that a material which is compatibilized at an interface be used as the first layer and the second layer when being laminated.

According to this configuration, the first layer and the second layer are strongly adhered to each other by compatibilizing the interface of the first layer and the second layer, and thus it is possible to manufacture one in which the exfoliation does not occur and the reliability is high. In addition, the electrophoresis layer can be brought close to the second layer since a state in which the second layer enters inside the first layer can be formed. Thereby, it is possible to effectively reduce the driving voltage which is applied to the electrophoresis layer.

In the second aspect, in the sealing, it is preferable that the second layer be laminated by applying a material including a conductive polymer onto the first layer.

According to this configuration, it is possible to simply and surely form the second layer on the first layer.

In the second aspect, in the sealing, it is preferable that the second layer be laminated on the first layer which is formed so that a part corresponding to the cell is recessed.

According to this configuration, it is possible to flow a forming material of the second layer into a recess of the first layer. Therefore, it is possible to form the second layer in which the film thickness is relatively thick at a part corresponding to the cell.

In the second aspect, in the sealing, it is preferable that the second layer be laminated in the form of an island on the first layer.

According to this configuration, it is possible to obtain a structure in which the resistance of the sealing member is selectively reduced.

In the second aspect, in the sealing, it is preferable that the second layer be laminated at a part corresponding to the cell on the first layer.

According to this configuration, it is possible to obtain a structure in which the resistance of the position corresponding to the cell is selectively reduced.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, description will be given of an embodiment of an electrophoresis display apparatus and an electronic device of the invention in accordance with drawings.

Moreover, as to the drawings used in the following descriptions, there are some cases in which characteristic parts are enlarged to be displayed for convenience in order to make characteristics understandable and a dimension ratio or the like of each constitutional element is not necessarily the same as in actuality.

First Embodiment

Figure 1A:
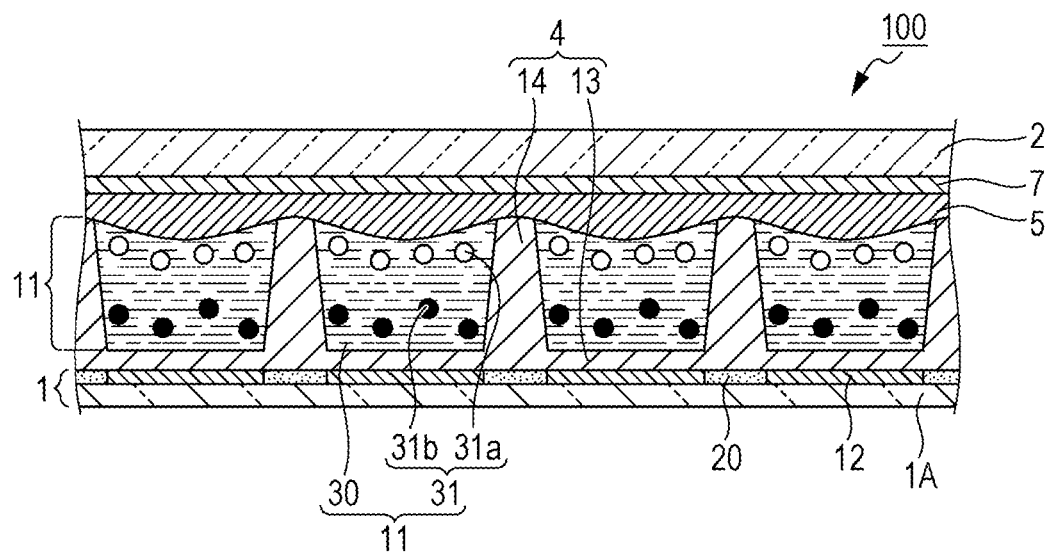
FIG. 1A is a schematic cross-sectional view of an electrophoresis display apparatus according to a first embodiment and FIG. 1B is an enlarged cross-sectional view of a main part of an electrophoresis display apparatus according to a first embodiment.
Figure 1B:
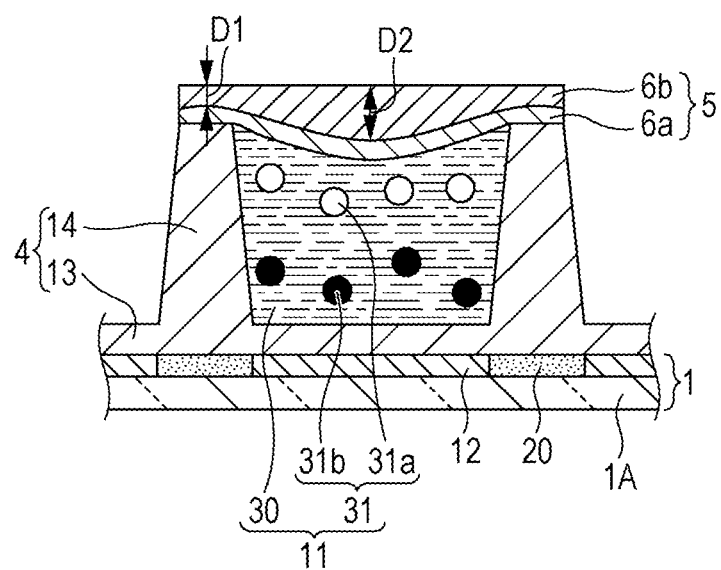

FIGS. 1A and 1B are views showing a schematic configuration of an electrophoresis display apparatus according to the embodiment, FIG. 1A is a schematic cross-sectional view of an electrophoresis display apparatus, and FIG. 1B is an enlarged cross-sectional view showing a main part of an electrophoresis display apparatus. As shown in FIG. 1A, an electrophoresis display apparatus 100 is provided with an element substrate 1, a counter substrate 2, an electrophoresis layer 11 which is arranged between the element substrate 1 and the counter substrate 2, a cell matrix 4 in which the electrophoresis layer 11 is divided into a plurality of storage parts by having a plurality of cells on the element substrate 1 and arranging the electrophoresis layer 11 in each of the cells, a sealing film 5 which is arranged on the electrophoresis layer 11, and a counter electrode 7 which is arranged on the sealing film 5.

The element substrate (one substrate of a pair of substrates) 1 includes a base material 1A and a pixel electrode 12 provided on the electrophoresis layer 11 side of the base material 1A. The base material 1A is a substrate consisting of glass, plastic, or the like and may not be transparent since the base material 1A is arranged at the opposite side to an image display surface. The pixel electrode 12 is an electrode formed by one in which a nickel plate and a gold plate are laminated in this order on a copper foil, or Al, indium-tin oxide (ITO), or the like. A scanning line, a data line, a selection transistor, and the like between the pixel electrode 12 and the base material 1A are formed (not shown).

The counter substrate (the other substrate of a pair of substrates) 2 is configured of a transparent base material such as glass or plastic and is arranged on the image display side. A counter electrode 7 having a planar shape facing a plurality of pixel electrodes 12 is formed on the electrophoresis layer 11 side of the counter substrate 2. The counter electrode 7 is a transparent electrode which is formed by MgAg, ITO, indium-zinc oxide (IZO), or the like.

The electrophoresis layer 11 is configured of a plurality of electrophoresis particles 31 which are dispersed in a dispersion medium 30. In the embodiment, the electrophoresis particles 31 include, for example, white particles 31a and black particles 31b.

The white particles 31a are particles (a polymer or a colloid) consisting of a white pigment such as, for example, titanium oxide, zinc oxide, or antimony trioxide, and are used, for example, by being negatively charged. The black particles 31b are particles (a polymer or a colloid) consisting of a black pigment such as, for example, aniline black or carbon black and are used, for example, by being positively charged. An electrolyte, a surfactant, a metallic soap, a resin, a rubber, oil, vanish, a charge control agent consisting of particles such as a compound, a dispersant such as a titanium-based coupling agent, an aluminium-based coupling agent, or a silane-based coupling agent, a lubricant, a stabilizer, or the like can be added to these pigments, as necessary.

In addition, a pigment such as, for example, red color, green color, or blue color may be used, instead of white particles 31a and black particles 31b. According to this configuration, it is possible to provide the electrophoresis display apparatus 100 capable of perform a color display by displaying red color, green color, blue color, or the like.

The dispersion medium 30 is, for example, a lipophilic hydrocarbon-based solvent and includes, for example, ISOPAR (registered trademark). That is, the dispersion medium 30 is, for example, a liquid including any one kind among ISOPAR E, ISOPAR G, ISOPAR H, ISOPAR L, or ISOPAR M or a liquid mixing two kinds or more among those, or a liquid mixing any one kind or more among those with another kind of hydrocarbon-based solvent.

Alternatively, the dispersion medium 30 may also be, for example, an aliphatic hydrocarbons such as pentane, hexane, or octane, an alicyclic hydrocarbons such as cyclohexane or methylcyclohexane, aromatic hydrocarbons such as benzene, toluene, xylene, or benzenes (alkyl benzene derivatives) having a long-chain alkyl group like hexylbenzene, heptylbenzene, octylbenzene, nonylbenzene, decylbenzene, undecylbenzene, dodecylbenzene, tridecylbenzene, or tetradecylbenzene, aromatic heterocycles such as pyridine, pyrazine, furan, pyrrole, thiophene, or methylpyrrolidone, esters such as methyl acetate, ethyl acetate, butyl acetate, or ethyl formate, ketones such as acetone, methyl ethyl ketone, diethyl ketone, methyl isobutyl ketone, methyl isopropyl ketone, or cyclohexanone, nitriles such as acetonitrile, propionitrile, or acrylonitrile, amides such as N,N-dimethylformamide or N,N-dimethylacetamide, a carboxylate, other various oils, and the like, and these can be used alone or as a mixture.

The cell matrix 4 has, for example, a base part 13 and a barrier wall 14 which is arranged on the base part 13. The cell matrix 4 is attached to the element substrate 1 through an adhesive layer 20.

Here, the base part 13 forms a bottom surface of the cell matrix 4 and is configured of a sheet-like (that is, a plate shape) member. There is no limitation to the thickness of the base part 13 and, for example, the base part may be a thin film having a thickness from approximately several μm to several tens of μm. In addition, the barrier wall 14 forms a sidewall of the cell matrix 4 and divides the electrophoresis layer 11 into a plurality of storage parts. The above of the element substrate 1 is divided into a plurality of spaces (that is, cells) by this barrier wall 14 and the electrophoresis layers 11 are respectively arranged on each of these plurality of cells. In the embodiment, the barrier wall 14 has a taper shape that is tapered as a cross-sectional structure goes toward the tip side opposite to the base part 13 side.

The shape of the barrier wall 14 in a plan view (hereinafter, also referred to as a planar shape) is, for example, a square lattice shape, a hexagonal lattice shape, or a triangle lattice shape.

Figure 2A:
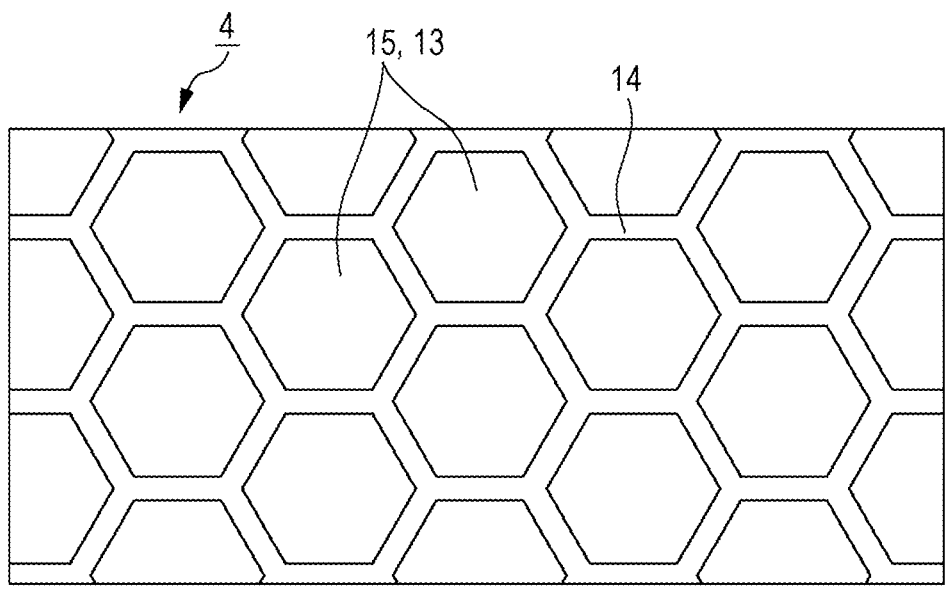
FIGS. 2A and 2B are plan views showing an example of a configuration of a cell matrix.
Figure 2B:
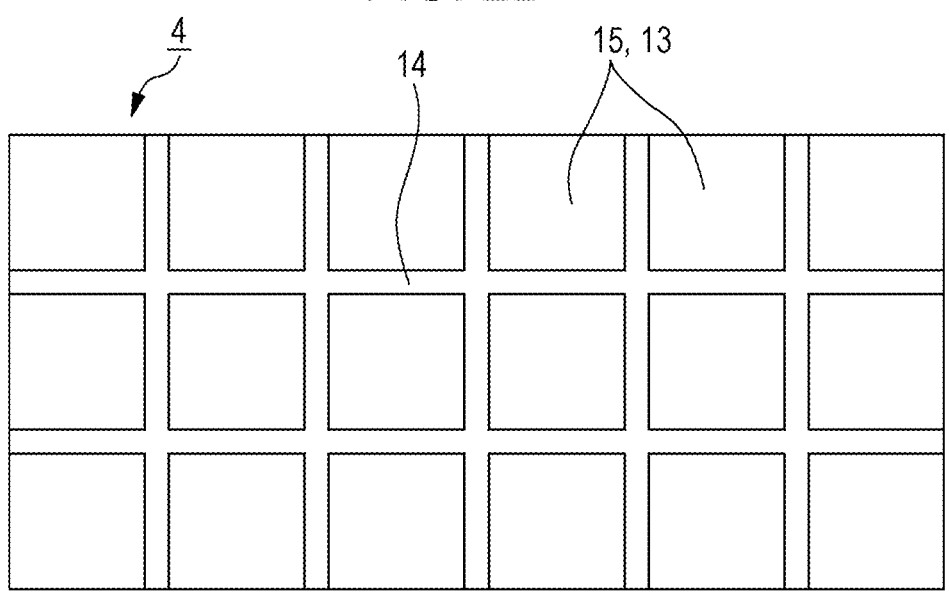

FIGS. 2A and 2B are plan views showing an example of a configuration of the cell matrix 4. As shown in FIG. 2A, in a case where the planar shape of the barrier wall 14 is a hexagonal lattice shape, the planar shape of a cell 15 becomes a hexagon. In addition, as shown in FIG. 2B, in a case where the planar shape of the barrier wall 14 is a square lattice shape, the planar shape of the cell 15 becomes a square. In the embodiment, the barrier wall 14 is a hexagonal lattice shape shown in FIG. 2A and the planar shape of the cell 15 is set to a hexagon.

Moreover, in FIGS. 1A and 1B, though cases where the barrier wall 14 is integrally formed with the plate-like base part 13 are shown, this is only one example. In the embodiment, the barrier wall 14 and the plate-like base part 13 are separately formed and then the barrier wall 14 may be fixed on one surface of the plate-like base part 13. Alternatively, the base part 13 is omitted and the cell matrix 4 may be configured of only barrier wall 14 (In this case, the barrier wall 14 may directly be mounted to the element substrate 1.).

In a case where the base part 13 and the barrier wall 14 are integrally formed, the base part 13 and the barrier wall 14 are configured of the same material. In addition, in a case where the base part 13 and the barrier wall 14 are separately formed, the base part 13 and the barrier wall 14 may be configured of the same material or may be configured of a different material.

A material configuring the base part 13 may be both a material having flexibility and a hard material and, for example, various resin materials such as an epoxy-based resin, an acrylic-based resin, an urethane-based resin, a melamine-based resin, or a phenol-based resin and various ceramic materials such as silica, alumina, or titania are included. However, in a case where plastic properties are imparted to the electrophoresis display apparatus 100, a resin material having plastic properties is selected as the base part 13. In addition, as a material configuring the barrier wall 14, for example, various resin materials such as, for example, an epoxy-based resin, an acrylic-based resin, an urethane-based resin, a melamine-based resin, or a phenol-based resin and various ceramic materials such as silica, alumina, or titania are included.

The sealing film 5 is a film for sealing the electrophoresis layer 11 inside the cell 15. In the embodiment, as shown in FIG. 1B, the sealing film 5 includes a base layer (a first layer) 6a and a conductive layer 6b (a second layer). The base layer 6a is formed with a constant film thickness along the surface of the electrophoresis layer 11 and a recess of the surface of the electrophoresis layer 11 appears on the surface of the base layer 6a. The base layer 6a is formed in a recessed state by entering inside the cell 15. The conductive layer 6b is laminated on the base layer 6a so as to fill the recess of the base layer 6a. Therefore, the conductive layer 6b has a shape in which the thickness D1 of a part (a part overlapping with the barrier wall in a plan view) corresponding to the barrier wall 14 is thinner than the thickness D2 of a part (a part overlapping with a opening of the cell 15 in a plan view) corresponding to the recess (the cell 15).

As a material configuring the base layer 6a, for example, a water-soluble polymer is included and, specifically, the material is one including any one kind among polyvinyl alcohol (also referred to as PVA), amino acid, gum arabic, an alginic acid derivative, albumin, carboxymethyl cellulose, a cellulose derivative, gelatin, polyethylene oxide, polystyrene sulfonic acid, polyvinyl pyrrolidone, polyvinyl phenol, a polyvinyl acetate derivative, or lecithin or two or more kinds among those. In the embodiment, the base layer 6a is formed using PVA.

As a material configuring the conductive layer 6b, for example, the water-soluble conductive polymer material, specifically, 3,4-polyethylene dioxythiophen/polystyrene sulfonic acid (PEDOT/PSS) is used. Therefore, as shown FIG. 1B, the base layer 6a is compatibilized with the conductive layer 6b at each other's interface. That is, as to the base layer 6a and the conductive layer 6b, the interface thereof is strongly bonded and thus the base layer 6a and the conductive layer 6b have excellent exfoliating resistance.

Moreover, in a case where a hydrocarbon-based solvent (for example, ISOPAR) is selected as a dispersion medium 30 and a film of the water-soluble polymer (for example, PVA) is selected as a sealing film 5 (a base layer 6a), there is an advantage as follow. That is, both hydrocarbon-based solvent (for example, ISOPAR) and PVA are cheap.

Therefore, it is possible to reduce a manufacturing cost of the electrophoresis display apparatus 100. In addition, it is possible to colorlessly and transparently form the sealing film 5, and thus it is possible to secure the light transmittance of approximately 90%. Since an attenuation of light due to the sealing film 5 is small, it is possible to enhance the visibility of a character, an image, or the like which is displayed on a screen (that is, an assembly of a plurality of cells 15) covered by the sealing film 5. In addition, since the compatibility between the sealing film 5 and the electrophoresis layer 11 is extremely low, it is possible to seal the electrophoresis layer 11 inside the cell 15 with high sealability.

In the electrophoresis display apparatus 100, for example, when a voltage is applied between the pixel electrode 12 and the counter electrode 7, the electrophoresis particles 31 (the white particles 31a and the black particles 31b) are electrophoresed toward any electrode (the pixel electrode 12 or the counter electrode 7) in accordance with an electric field generated between these, on the basis of such a configuration. For example, in a case where the white particles 31a have a positive charge, when the pixel electrode 12 is set to the negative potential, the white particles 31a are moved to the pixel electrode 12 side (the lower side) to be gathered, and thus black is displayed. Thereby, the electrophoresis display apparatus 100 becomes possible to display a desired image.

Incidentally, as to the base layer 6a formed by the water-soluble polymer, there is a problem that the electric resistance is high. Therefore, there is a risk of causing the need to apply a high driving voltage with respect to the electrophoresis layer 11. In contract, in the embodiment, the sealing film 5 in which the conductive layer 6b is laminated on the base layer 6a is provided.

According to this, as to the sealing film 5, the resistance of the surface is reduced by providing with the conductive layer 6b. Thereby, it is possible to reduce the contact resistance between the counter electrode 7 arranged on the sealing film 5 and the sealing film 5. Therefore, in the electrophoresis display apparatus 100, since the driving voltage of the electrophoresis layer 11 is reduced, it is possible to suppress the power consumption.

In addition, the conductive layer 6b is in a state entering inside the base layer 6a by the interface being compatibilized with respect to the base layer 6a. Therefore, the conductive layer 6b becomes in a state of being close to a lower layer (the electrophoresis layer 11) of the base layer 6a. Thus, it is possible to effectively reduce the resistance of the sealing film 5.

In addition, in the embodiment, the conductive layer 6b has a shape in which the thickness D1 of a part corresponding to the barrier wall 14 is thinner than the thickness D2 of a part corresponding to the cell 15. Therefore, the resistance of the sealing film 5 which seals each cell 15 is successfully reduced. Thus, it is possible to suppress the driving voltage with respect to the electrophoresis layer 11 which is arranged inside each cell 15 and as a result, it is realize low power consumption in an entire apparatus. In addition, it is possible to successfully contact the counter electrode 7 with the conductive layer 6b by forming the conductive layer 6b so as to fill the recess generated on the base layer 6a. Thereby, a suppressing effect of the driving voltage described above can be made more significant.

Subsequently, description will be given of a method of manufacturing an electrophoresis display apparatus 100 in accordance with drawings.

FIGS. 3A, 3B, and 3C and FIGS. 4A, 4B, and 4C are cross-sectional views showing a manufacturing process of an electrophoresis display apparatus 100.

Figure 3A:
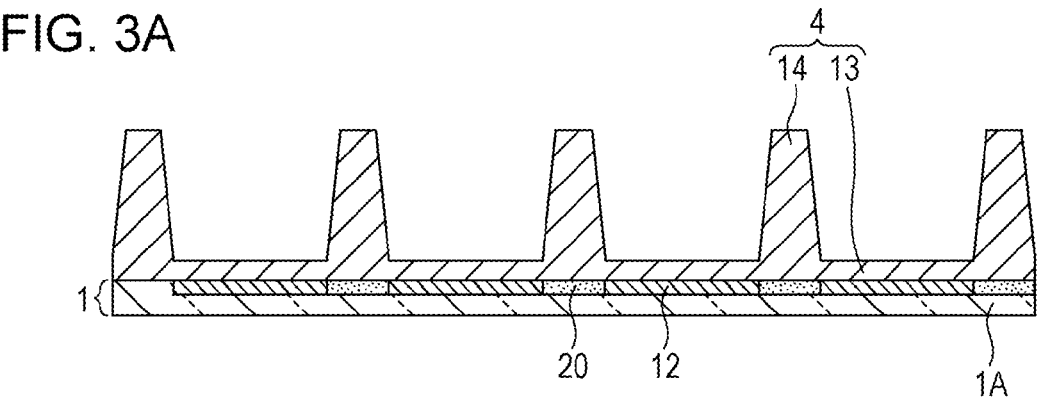
FIGS. 3A, 3B, and 3C are cross-sectional views showing a manufacturing process of an electrophoresis display apparatus.

As shown in FIG. 3A, firstly, the cell matrix 4 is prepared. In the embodiment, one in which the element substrate 1 is attached to the surface of the base part 13 side of the cell matrix 4 through the adhesive layer 20 in advance is used.

Figure 3B:
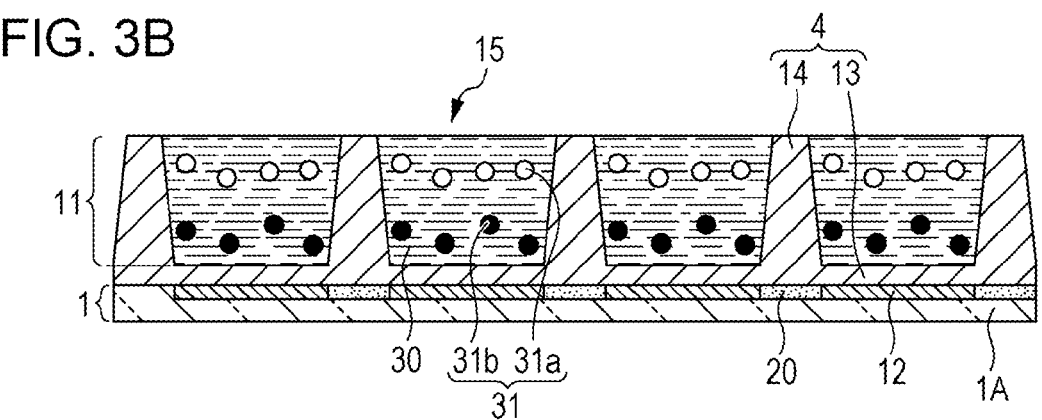

Next, as shown in FIG. 3B, the electrophoresis layer 11 (that is, a dispersion liquid having a plurality of electrophoresis particles 31 and the dispersion medium 30) is supplied to the inside of each cell 15 of the cell matrix 4 (arranging). Moreover, as the supply of the electrophoresis layer 11 to the inside of each cell 15, for example, various application methods such as a dripping method using a dispenser, an ink jet method (a liquid droplet discharging method), a spin coating method, a dip coating method, or a spray coating method are included, however, among those, it is preferable to use a dripping method or an ink jet method. By using a dripping method or an ink jet method, since it is possible to selectively supply the electrophoresis layer 11 with respect to an intended storage part, it is possible to more surely supply the electrophoresis layer 11 to the inside of the cell 15 with no waste.

Figure 3C:
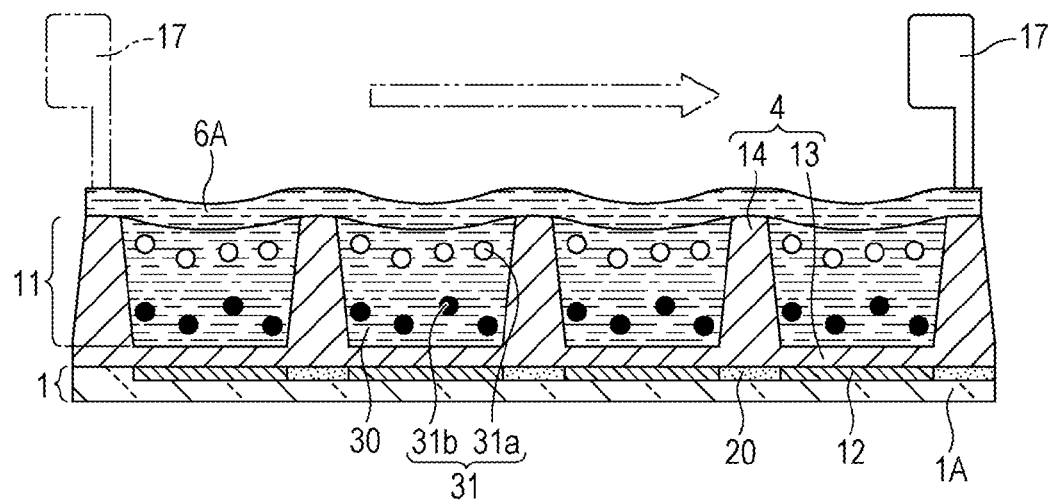

Next, as shown in FIG. 3C, a opening part side of the cell matrix 4 in which the electrophoresis layer 11 has been supplied is covered by PVA which is a forming material of the base layer 6a to seal the electrophoresis layer 11 inside each cell 15 of the cell matrix 4 (a sealing step; a step of forming the first layer). In the embodiment, after the electrophoresis layer 11 is supplied to the inside of the cell 15, the sealing is performed after a certain standby time is provided. Thereby, it is possible to lower the surface (that is, the liquid surface) of the electrophoresis layer 11 at a central part of the cell 15, and thus it is possible to make the shape thereof in a cross-sectional view a recessed shape.

A film forming method of the base layer 6a is, for example, as follow. That is, PVA is dissolved in, for example, water or a hydrophilic liquid (as one example, methanol or ethanol) to be liquefied and a sealing liquid is produced. For example, PVA is dissolved in water to produce 3 wt % to 40 wt % (weight percent) sealing liquid. Next, this sealing liquid 6A is applied to the opening part side of the cell matrix 4. The electrophoresis layer 11 is lipophilic and the sealing liquid 6A is hydrophilic, therefore the electrophoresis layer 11 is not mixed with the sealing liquid 6A.

Moreover, in an applying step of the sealing liquid 6A, for example, the sealing liquid 6A is uniformly applied onto the entire surface of the opening part side of the cell matrix 4 using a squeegee 17. In addition, the method of applying the sealing liquid 6A may be a method other than this and, for example, a method of applying using a die coater or a comma coater is included.

Moreover, a crosslinking agent may be added to the sealing liquid 6A. As a crosslinking agent, for example, a boric acid aqueous solution is added. A boric acid aqueous solution includes a borate ion. In the sealing liquid 6A, a borate ion makes molecules of PVA connect with each other (that is, gelation). This gelation occurs due to a multipoint intermolecular force (a hydrogen bond, a coordinate bond, a covalent bond, or the like). Thereby, it is possible to set the viscosity of the sealing liquid 6A to, for example, 1,000 [mPa·s] or higher and thus it is possible to obtain a gel-like PVA aqueous solution. Thereby, handling of the sealing liquid 6A is facilitated and thus it is possible to simplify the manufacturing process.

Figure 4A:
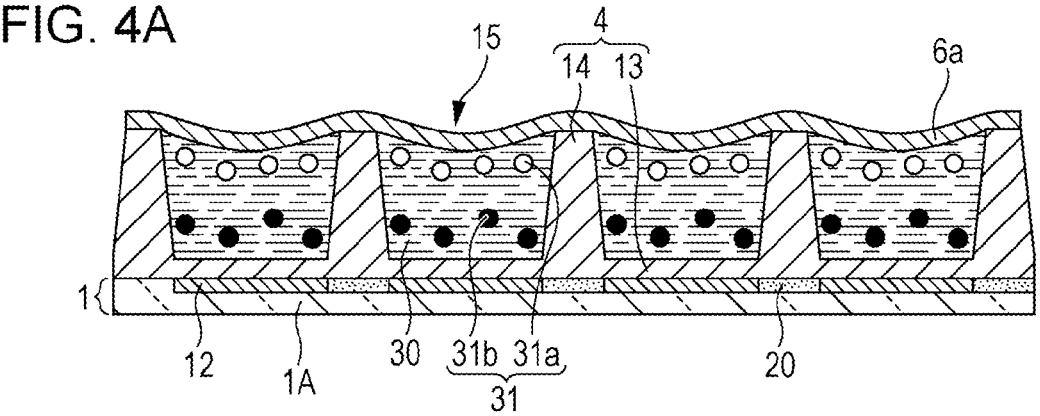
FIGS. 4A, 4B, and 4C are cross-sectional views showing a manufacturing process of an electrophoresis display apparatus, which follows FIGS. 3A, 3B, and 3C.

Next, as shown in FIG. 4A, the applied sealing liquid 6A is dried to be cured. For example, the sealing liquid 6A is left under a temperature environment from room temperature to approximately 50° C. and then this is dried to be cured. The required time for a drying treatment is, for example, from approximately several minutes to several hours, depending on the thickness of the sealing liquid 6A. Since the concentration of PVA in a film of the sealing liquid 6A is high, the drying of the sealing liquid 6A can be performed with natural drying or at a relatively low temperature. Accordingly, a sealing film 5 is formed on an exposed part of the electrophoresis layer 11 which has been supplied to the inside of the cell 15. Thereby, the electrophoresis layer 11 is sealed inside the cell 15 with high sealability. In this drying treatment, since moisture included in the sealing liquid 6A is volatilized (that is, evaporated), the thickness of the base layer 6a becomes thinner, compared to the thickness immediately after application (refer to FIG. 3C and FIG. 4A).

Figure 4B:
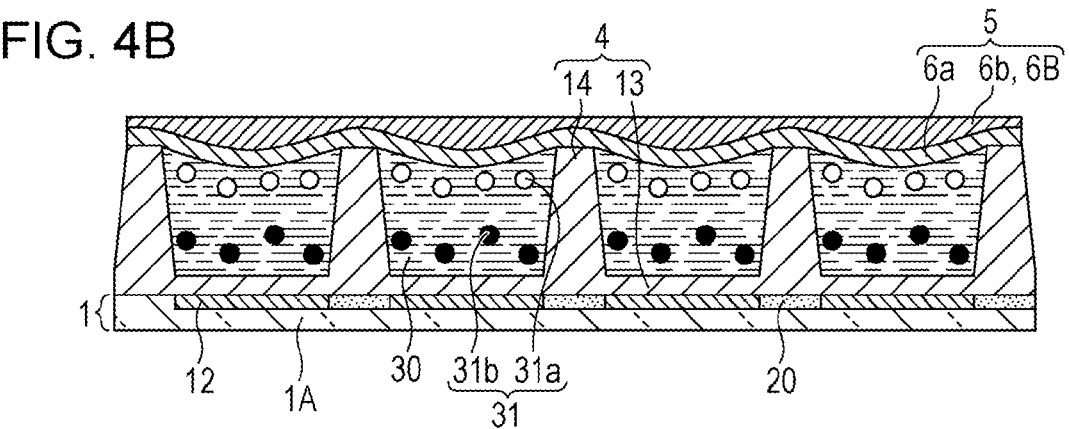

Next, as shown in FIG. 4B, a water-soluble conductive polymer is applied onto the base layer 6a (a sealing step; a step of forming the second layer). In the embodiment, as a water-soluble conductive polymer, for example, PEDOT/PSS is used. Moreover, another water-soluble conductive polymer is not limited to PEDOT/PSS and poly-3-ethyl sulfonic acid thiophene may also be used. Alternatively, as a commercial product, a water-based hard coat material SEPLEGYDA HC-W (manufactured by Shin-Etsu Polymer Co., Ltd.) may also be used.

Since the base layer 6a is formed in a recessed state by entering inside the cell 15, a coating film 6B of PEDOT/PSS is arranged more at a part corresponding to the cell 15 than at a part corresponding to the barrier wall 14. Then, the sealing film 5 on which the base layer 6a and the conductive layer 6b are laminated is formed by the base layer 6a being compatibilized with the coating film 6B of PEDOT/PSS which is arranged on the base layer 6a. As to the sealing film 5 thus formed, the thickness D1 of a part corresponding to the barrier wall 14 becomes thinner than the thickness D2 of a part corresponding to the cell 15, in the conductive layer 6b (refer to FIG. 1B).

Figure 4C:
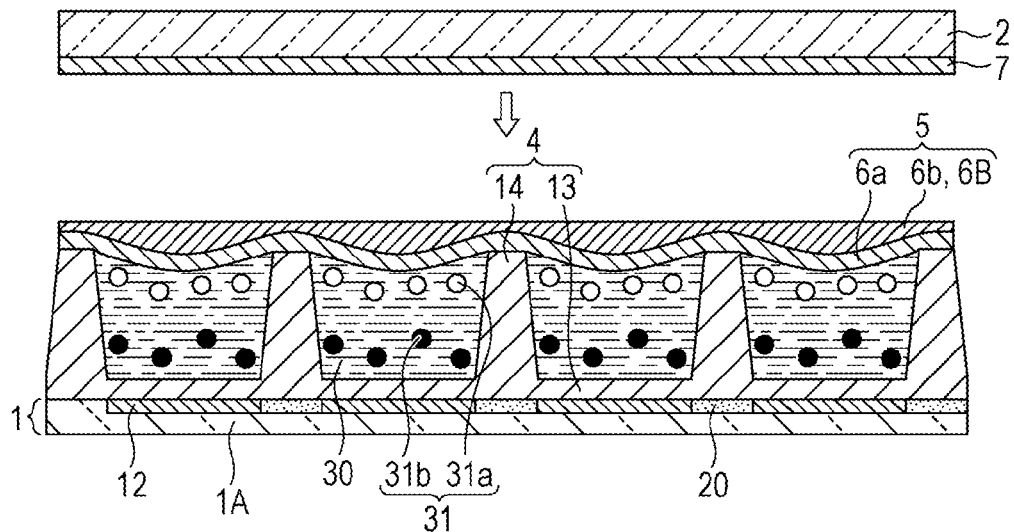

Next, as shown in FIG. 4C, the counter substrate 2 having the counter electrode 7 is prepared. In the embodiment, in order to impart the flexibility to the electrophoresis display apparatus 100, a resin substrate having flexibility is selected as a counter substrate 2. Then, the counter substrate 2 is attached to the cell matrix 4 using the adhesive layer (not shown).

The electrophoresis display apparatus 100 shown in FIG. 1A is completed through the above steps.

As described above, in the electrophoresis display apparatus 100 according to the embodiment, since the sealing film 5 in which the resistance of the surface is reduced is provided, by providing with the conductive layer 6b, it is possible to reduce the contact resistance between the counter electrode 7 and the sealing film 5. Thereby, the electrophoresis display apparatus 100 becomes one in which low power consumption is achieved and an added value is high, by reducing the driving voltage of the electrophoresis layer 11.

In addition, according to the method of manufacturing described above, it is possible to realize low power consumption associated with a reduction in resistance of the sealing film 5, furthermore, a reduction in driving voltage by a simple step in which the base layer 6a and the conductive layer 6b are laminated. Therefore, it is possible to provide the electrophoresis display apparatus 100 in which an added value is high, at low cost.

Second Embodiment

Subsequently, description will be given of an electrophoresis display apparatus according to a second embodiment. The difference between this embodiment and the first embodiment is a position at which the conductive layer 6b is formed and the configuration other than that is alike. Therefore, in the following description, as to the configuration which is common to the embodiment, the same references are used and a detailed description thereof will be omitted.

Figure 5:
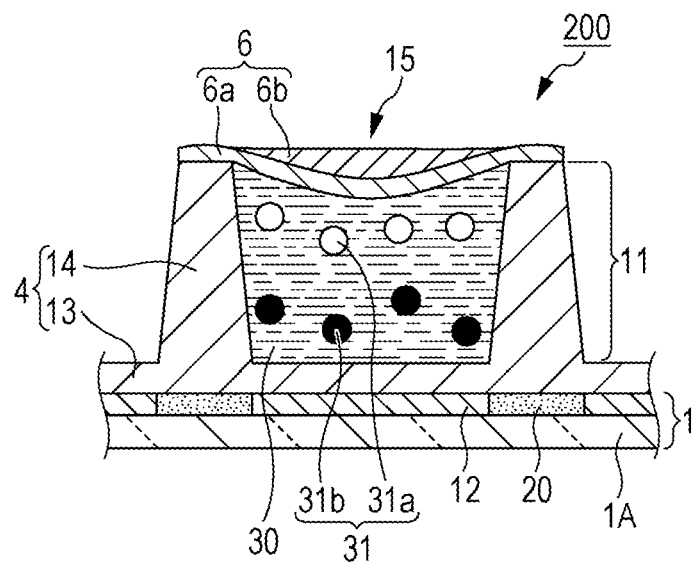
FIG. 5 is a cross-sectional view showing a configuration of a main part of an electrophoresis display apparatus according to a second embodiment.
Figure 6:
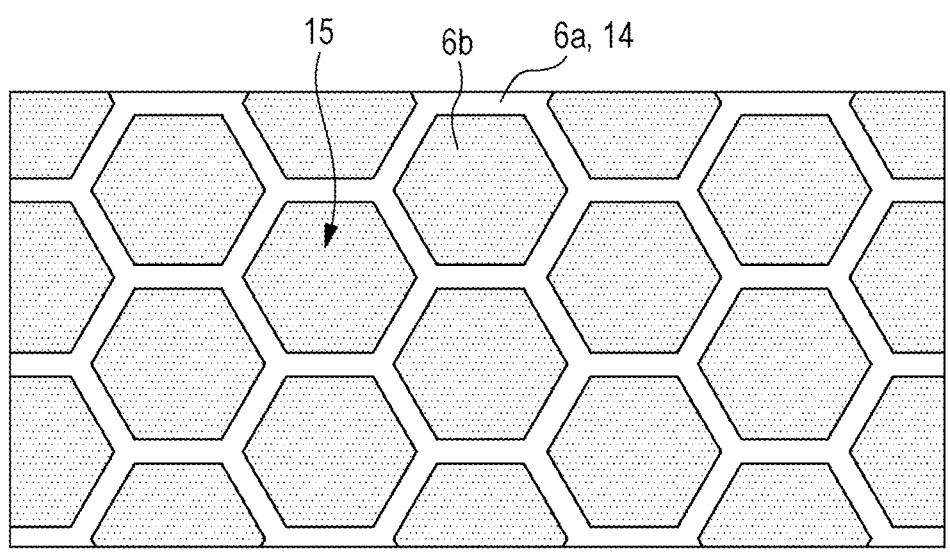
FIG. 6 is a plan view showing a configuration of a main part of an electrophoresis display apparatus.

FIG. 5 is a cross-sectional view showing a configuration of a main part of an electrophoresis display apparatus 200 according to the embodiment and is a view corresponding to FIG. 1B. FIG. 6 is a plan view showing a configuration of a main part of an electrophoresis display apparatus 200.

As shown in FIG. 5, in the embodiment, the conductive layer 6b is arranged at a position corresponding to the cell 15 in the base layer 6a, in the form of a plurality of islands which are mutually separated. That is, as shown in FIG. 5 and FIG. 6, the conductive layer 6b is selectively arranged inside each opening part of the cell 15 except the barrier wall 14. Thereby, in the embodiment, the resistance of only the surface corresponding to each cell 15 in the sealing film 5 is selectively reduced.

Figure 7A:
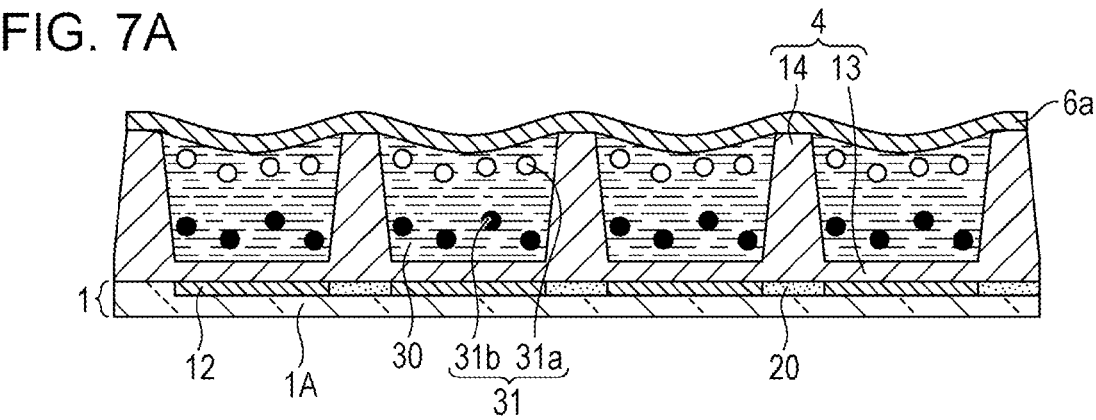
FIGS. 7A, 7B, and 7C are views showing a manufacturing process of an electrophoresis display apparatus of a second embodiment.
Figure 7B:
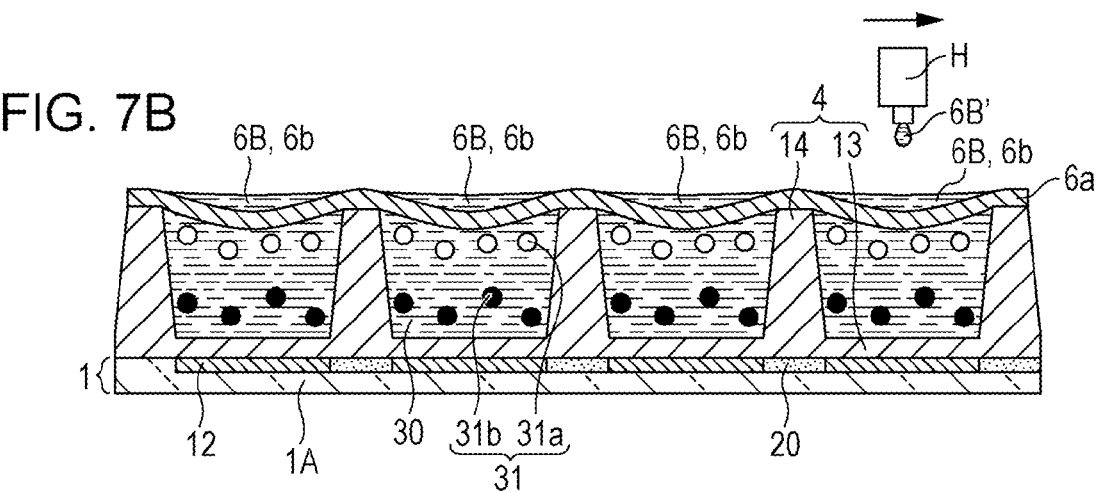
Figure 7C:
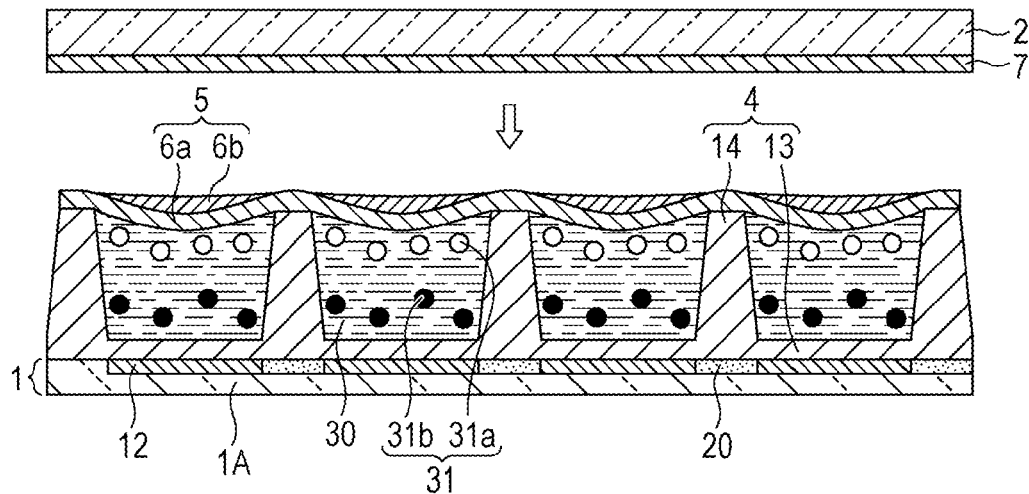

FIGS. 7A, 7B, and 7C are views showing a manufacturing process of an electrophoresis display apparatus 200 of the embodiment. Moreover, since processes of the second embodiment are the same as the steps shown in FIGS. 3A, 3B, and 3C of the first embodiment until the step in which the cell 15 is sealed with the base layer 6a, drawings and descriptions thereof will also be omitted.

As shown in FIG. 7A, the applied sealing liquid 6A is dried to be cured. Afterward, in the embodiment, a forming material of the conductive layer 6b is selectively applied onto the base layer 6a by using an ink jet process (a sealing step; a step of forming the second layer).

In the embodiment, as shown in FIG. 7B, the coating film 6B is formed in the recess of the base layer 6a formed in each cell 15 by discharging liquid droplets 6B' (PEDOT/PSS) from an ink jet head H. The coating film 6B is successfully maintained due to the recess. Then, the sealing film 5 on which the base layer 6a and the conductive layer 6b are laminated is formed by the base layer 6a being compatibilized with the coating film 6B' of PEDOT/PSS which is arranged on the base layer 6a. The sealing film 5 thus formed is arrange at a part corresponding to the cell 15, in the form of an island (refer to FIG. 6).

Next, as shown in FIG. 7C, the counter substrate 2 having the counter electrode 7 is prepared and the counter substrate 2 is attached to the cell matrix 4 using the adhesive layer (not shown). The electrophoresis display apparatus 200 according to the embodiment is completed through the above steps.

As described above, in the electrophoresis display apparatus 200 according to the embodiment, since the conductive layer 6b is provided for each cell 15, the electrophoresis display apparatus 200 becomes one provided with the sealing film 5 in which the resistance of the surface is selectively reduced. Thereby, it is possible to enhance the electric field strength generated between the counter electrode 7 and the pixel electrode 12 in each cell 15 more than the electric field strength between the electrodes in the periphery of the cell 15 in a plan view, by reducing the resistance of the sealing film 5 which is arranged in each cell 15. Thereby, it is possible to reduce the electrical effect in which the electric field in the periphery of the cell 15 gives to the electrophoresis layer 11 in the other cells 15. As a result, it is possible to prevent an occurrence of crosstalk between the adjacent cells 15. Therefore, it is possible to improve the contrast of an image display, and thus it is possible to obtain an excellent image quality.

In a method of manufacturing the electrophoresis display apparatus 200 according to the embodiment, since the conductive layer 6b is selectively formed, it is possible to effectively use the forming material of the conductive layer 6b. Therefore, it is possible to reduce a manufacturing cost of the electrophoresis display apparatus 200.

Hereinbefore, description was given of the embodiment of the invention, however, the invention is not limited to the embodiment described above and can appropriately be changed in a range without departing from the gist of the invention. For example, in the embodiment, though a case where the counter electrode 7 is laminated on the sealing film 5 was given as an example, in the configuration according to the first embodiment, the conductive layer 6b which is continuously formed over a plurality of cells 15 on the base layer 6a may be used as a counter electrode. Thereby, since the counter electrode 7 becomes unnecessary, the configuration of the apparatus is simplified, and thus a reduction in manufacturing cost is achieved.

In addition, in the embodiment described above, a case of forming the sealing film 5 on which the base layer 6a and the conductive layer 6b are laminated by laminating PVA consisting of the water-soluble polymer and PEDOT/PSS as a water-soluble conductive polymer material was given as an example, however, the invention is not limited thereto. For example, the sealing film may also be formed by applying the conductive polymer which is dissolved in an organic solvent onto the base layer consisting of an organic material. In this case, as a conductive polymer which is dissolved in an organic solvent, for example, poly-3-hexylthiophene, polyacetylene, poly-para-phenylene vinylene (PPV), and the like are exemplified.

Alternatively, a conductive polymer represented by the following chemical formula may also be used.

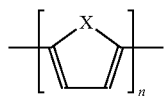

[Chem. 1]

(X=NH/N,S)
(However, a plurality of X may be the same as or different from each other)

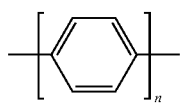

[Chem. 2]

(X=NH,S)
(However, a plurality of X may be the same as or different from each other)

In addition, as a commercial product, SEPLEGYDA SAS-AcH, SAS-AcP, and SAS-AcD (manufactured by Shin-Etsu Polymer Co., Ltd.) may also be used.

In addition, the sealing film 5 may be formed by applying a conductive paste including conductive particles on the base layer 6a or sticking a conductive film.

The entire disclosure of Japanese Patent Application No. 2013-209930, filed Oct. 7, 2013 is expressly incorporated by reference herein.

What is claimed is:

1. An electrophoresis display apparatus, comprising:
a pair of substrates;
an electrophoresis layer including electrophoresis particles and a dispersion medium in which the electrophoresis particles are dispersed, and arranged in plurality of cells divided by a barrier wall which is arranged between the pair of substrates;
an electrode disposed between a first substrate of the pair of substrates and the electrophoresis layer; and
a sealing member which seals the electrophoresis layer arranged in the cell,
wherein the sealing member includes a first layer and a second layer laminated on the first layer, both the first and second layers being disposed between the electrode and the electrophoresis layer and
wherein the electric resistance of the second layer is lower than that of the first layer.

2. The electrophoresis display apparatus according to claim 1,
wherein the first layer is compatibilized with the second layer at an interface.

3. The electrophoresis display apparatus according to claim 1,
wherein the second layer is configured by applying a material including a conductive polymer onto the first layer.

4. The electrophoresis display apparatus according to claim 1,
wherein, as to the first layer, a part corresponding to the cell is recessed in the electrophoresis layer side.

5. The electrophoresis display apparatus according to claim 4,
wherein, as to the second layer, the thickness of a part corresponding to the barrier wall is thinner than the thickness of a part corresponding to the cell.

6. The electrophoresis display apparatus according to claim 1,
wherein the second layer is laminated in the form of an island on the first layer.

7. The electrophoresis display apparatus according to claim 6,
wherein the second layer is arranged at a position corresponding to the cell.

8. The electrophoresis display apparatus according to claim 1, wherein the electrode is a counter electrode.

9. A method of manufacturing an electrophoresis display apparatus, comprising:
arranging an electrophoresis layer including electrophoresis particles and a dispersion medium in which the electrophoresis particles are dispersed, in a cell divided by a barrier wall member on a substrate;
arranging an electrode disposed between a first substrate of the pair of substrates and the electrophoresis layer; and
sealing the cell on which the electrophoresis layer is arranged by a sealing member,
wherein the sealing includes forming a first layer which seals the cell and laminating a second layer of which the electric resistance is lower than that of the first layer on the first layer both the first and second layers being disposed between the electrode and the electrophoresis layer.

10. The method of manufacturing an electrophoresis display apparatus according to claim 9,
wherein, in the sealing, a material which is compatibilized at an interface is used as the first layer and the second layer when being laminated.

11. The method of manufacturing an electrophoresis display apparatus according to claim 9,
wherein, in the sealing, the second layer is laminated by applying a material including a conductive polymer onto the first layer.

12. The method of manufacturing an electrophoresis display apparatus according to claim 9,
wherein, in the sealing, the second layer is laminated on the first layer which is formed so that a part corresponding to the cell is recessed in the electrophoresis layer side.

13. The method of manufacturing an electrophoresis display apparatus according to claim 9,
wherein, in the sealing, the second layer is laminated in the form of an island on the first layer.

14. The method of manufacturing an electrophoresis display apparatus according to claim 13,
wherein, in the sealing, the second layer is laminated at a part corresponding to the cell on the first layer.

* * * * *